United States Patent [19]

Lach

[11] Patent Number: 4,641,007

[45] Date of Patent: Feb. 3, 1987

[54] PROCESS AND DEVICE FOR TREATMENT OF METAL-BONDED NONCONDUCTIVE MATERIALS

[76] Inventor: Horst Lach, Dammstrasse 5, D-6450 Hanau 1, Fed. Rep. of Germany

[21] Appl. No.: 503,157

[22] PCT Filed: Oct. 4, 1982

[86] PCT No.: PCT/EP82/00221

§ 371 Date: Jun. 1, 1983

§ 102(e) Date: Jun. 1, 1983

[87] PCT Pub. No.: WO83/01216

PCT Pub. Date: Apr. 14, 1983

[30] Foreign Application Priority Data

Oct. 5, 1981 [EP] European Pat. Off. ........ 81107929.2
May 28, 1982 [DE] Fed. Rep. of Germany ....... 3220207

[51] Int. Cl.$^4$ .................. B23H 5/04; B23H 5/06; B23H 7/30
[52] U.S. Cl. .................. 219/69 M; 204/129.46; 204/179.5; 204/217; 204/224 M; 219/69 R; 219/69 C; 219/69 D; 219/69 G; 219/69 V
[58] Field of Search .............. 219/69 R, 69 E, 69 M, 219/69 V, 68, 69 D, 69 G; 204/129.4, 129.46, 217, 129.43, 129.5, 218, 224 M

[56] References Cited

U.S. PATENT DOCUMENTS

| | | | |
|---|---|---|---|
| 2,427,588 | 9/1947 | Burnett | 219/69 E |
| 2,778,794 | 1/1957 | Comstock | 204/218 |
| 2,818,491 | 12/1957 | Matulaitis | 219/69 G |
| 2,905,605 | 9/1959 | Keelriz et al. | 204/129.43 |
| 2,939,941 | 6/1960 | Heerschap et al. | 219/69 M |
| 2,974,215 | 3/1961 | Inoue | 219/69 M |
| 3,004,910 | 10/1961 | Keelriz et al. | 204/129.5 |
| 3,122,628 | 2/1964 | Inoue | 219/69 V |
| 3,420,759 | 1/1969 | Inoue | 219/69 D |
| 3,476,662 | 11/1969 | Inoue | 204/129.43 |
| 3,650,938 | 3/1972 | Olton et al. | 204/218 |
| 3,751,346 | 8/1973 | Ellis et al. | 204/129.46 |
| 3,770,610 | 11/1973 | Gehring | 204/129.46 |
| 3,816,290 | 6/1974 | Suzuki et al. | 204/218 |
| 4,013,526 | 3/1977 | Inoue | 204/129.46 |
| 4,013,863 | 3/1977 | Osenbruggen et al. | 219/69 M |
| 4,049,942 | 9/1977 | Balleys et al. | 219/69 M |
| 4,125,444 | 11/1978 | Inoue | 204/129.43 |
| 4,140,598 | 2/1979 | Kimoto et al. | 204/129.46 |
| 4,236,985 | 12/1980 | Grodzinsky et al. | 219/69 V |
| 4,243,862 | 1/1981 | Wetzels | 219/69 E |
| 4,296,302 | 10/1981 | Bell, Jr. et al. | 219/69 G |
| 4,310,742 | 1/1982 | Pfau | 219/69 G |
| 4,361,745 | 11/1982 | Rupert et al. | 219/69 G |
| 4,367,389 | 1/1983 | Inoue | 219/69 C |
| 4,367,391 | 1/1983 | Furukawa | 219/69 M |
| 4,387,287 | 6/1983 | Marazzi | 219/69 R |
| 4,405,421 | 9/1983 | Inoue | 204/129.5 |
| 4,448,656 | 5/1984 | Kuromatsu | 219/69 E |
| 4,510,368 | 4/1985 | Schlienger et al. | 219/69 D |

FOREIGN PATENT DOCUMENTS

| | | | |
|---|---|---|---|
| 1452631 | 8/1966 | France . | |
| 1601363 | 9/1970 | France | 204/129.46 |
| 2374439 | 7/1978 | France . | |
| 121293 | 10/1978 | Japan | 219/69 D |
| 58-22626 | 2/1983 | Japan | 204/129.46 |
| 341926 | 12/1959 | Switzerland | 219/69 R |
| 639676 | 12/1978 | U.S.S.R. | 204/224 M |
| 704746 | 12/1979 | U.S.S.R. | 219/69 V |

Primary Examiner—A. D. Pellinen
Assistant Examiner—Geoffrey S. Evans
Attorney, Agent, or Firm—Dennison, Meserole, Pollack & Scheiner

[57] ABSTRACT

A rotating electrode tool made of polycrystalline synthetic diamonds in a metal foundation is used in the electro-erosive machining and mechanical grinding of a metal bonded, electrically non-conductive hard material such as synthetic diamonds or boron nitrides in an electrically conductive metal matrix. The tool is first used to electro-erosively machine the workpiece. When a signal is obtained from the machining current or voltage indicating that no further electroerosive removal is possible, the tool automatically mechanically grinds the workpiece to remove nonconductive particles not removed by spark erosion.

34 Claims, 12 Drawing Figures

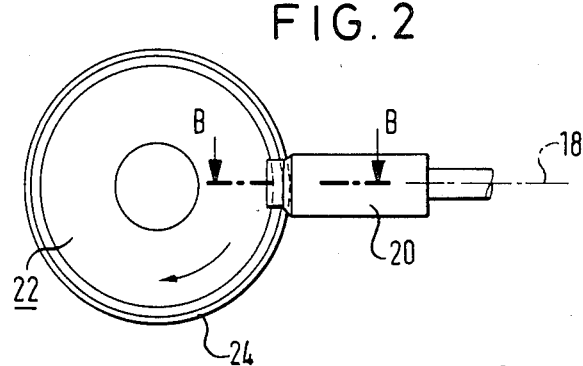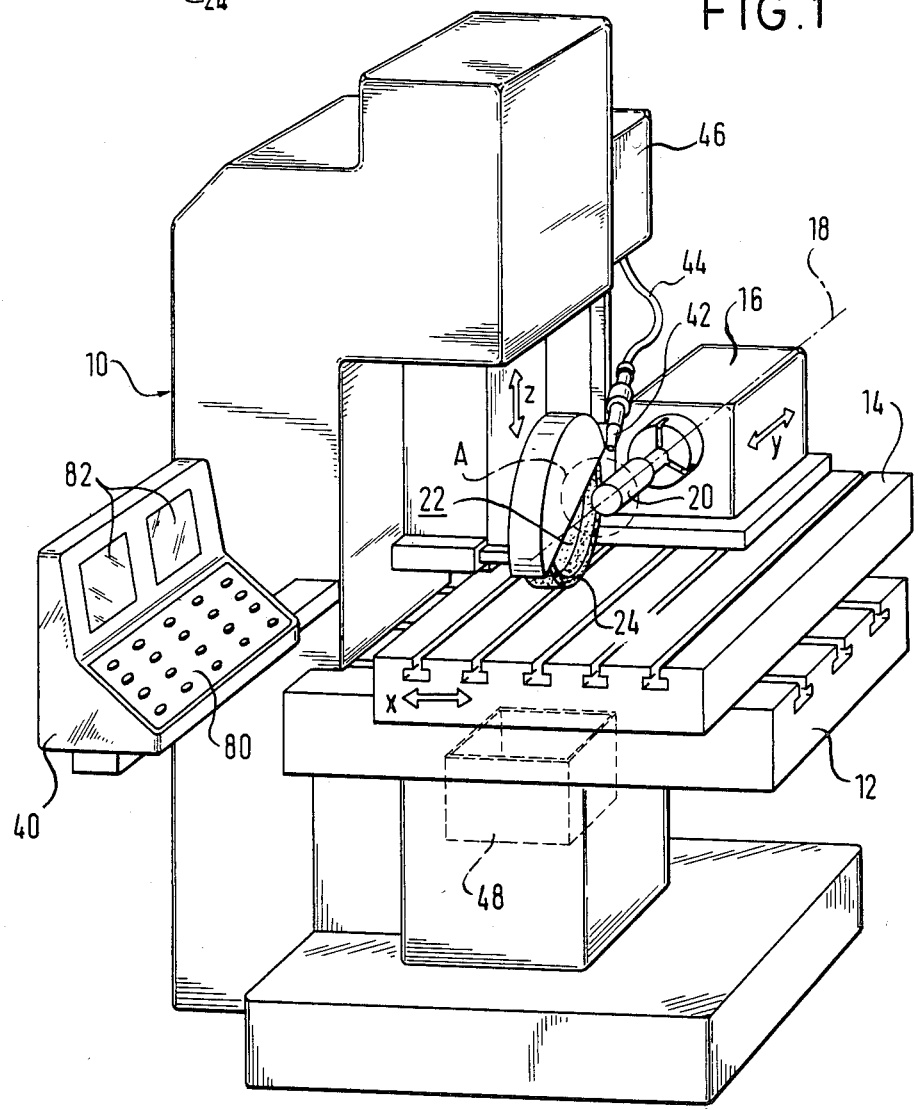

PROCESS AND DEVICE FOR TREATMENT OF METAL-BONDED NONCONDUCTIVE MATERIALS

The present invention relates to a process and a device for the treatment of metal-bonded workpieces of nonconductive hard materials. Treatment in this case means the change of the shape or condition of the relevant material. It may include separating, shaping or post-shaping, sharpening or post-sharpening.

The metal-bonded workpieces of nonconductive material could be tools or parts of tools, of which the hard material can be polycrystalline synthetic diamonds, boron nitrides, oxide ceramics or the like. The tools can be saws, cutting blades, rotary tools, chisels, drills, milling cutters, levelling blocks, levelling rollers or grinding disks or the like.

The high-strength property of these materials, whereby the tools manufactured of these materials, in comparison with other tools, have longer stability and shorter working steps, leads to difficulties in the manufacture or post-grinding of these tools. The manufacture or post-treatment of these sorts of highly valuable tools causes their positive material properties to have a negative effect, and to present many problems to the manufacturer of these sorts of tools. Therefore special methods for the manufacture and post-treatment of these tools are always being sought which also fulfill the requirements of economy and precision. Numerous processes have been disclosed to shape the special tool materials such as synthetic diamonds or the like.

Recently, attempts have been made to treat at least the naturally nonconductive high strength materials electrically. Either the nonconductive crystals have been treated mechanically in a complex process, wherein in addition to the drilling, a supplementary electrical discharge can be used (U.S. Pat. No. 2,552,582), DE-PS No. 856 874), or small parallel guided wire electrodes are brought near to or into contact with the diamond, so that the discharge acts on the diamonds (U.S. Pat. No. 4,103,137). These tests did not lead to industrial manufacture of tools. Their uses are limited to special situations, such as for example in space travel.

Processes are also known to attack the metallic bonding material between the crystals of synthetic diamonds with treatment by electro- or spark erosion, which is advantageous particularly in the manufacture or post-treatment of polycrystalline synthetic diamond cutting surfaces (EP-No. A2 10 276=EP-No. A1 79 103 949.9). The surface roughness which is thus obtained may even be useful up to a certain cutting quality. However, if higher quality surfaces are required, these surface roughnesses which result from the distribution and size of the hard material particles in the metal bonding can no longer be tolerated.

The object of the present invention is therefore a process and device for the manufacture or post-treatment of the aforementioned tools with metal-bonded nonconductive high-strength materials with treated working surfaces which require a still higher surface quality.

The solution of this problem according to the invention is staggeringly simple, wherein opposite the workpiece which serves as an electrode in the electro- or spark erosion system is found a second electrode, also a metal-bonded tool, particularly a grinding tool, which, in its metal bonding, also has high-strength, nonconductive materials, such as polycrystalline synthetic diamonds.

It is known to use moving metal parts as an electrode for pure metal treatment, but not for the treatment of workpieces with polycrystalline synthetic diamonds. Thus, rotating copper electrodes are used in electroerosion countersinking in metal. The rotating metal part thus works only electrically. As a result of the rotation, a spark is distributed and electrode overheating is avoided. Contact between electrode and workpiece never occurs. Such contact is avoided by complex control to avoid destruction or deformation of the rotating soft metal electrode.

Furthermore, it is known to use wire spark erosion machines for pure metal treatment, in which the thin wire consisting substantially of copper is moved rapidly along its axis. Also with this, however, there is no contact between the metal workpiece and the wire used as electrode.

On the other hand, in the process according to the invention, a moving, e.g. rotating, tool is used opposite very hard materials, such as e.g. polycrystalline synthetic diamonds, which are to be deformed, and the moving tool serves as an electrode, which normally serves with contact with the workpiece in order to remove material mechanically, and the electrode controls this tool in such a manner that first of all there is no mechanical contact, but there is a sparkover over a certain small gap, removing material from the workpiece; then in this manner the high surface qualities required in industry can be manufactured commercially. A precise explanation of the reason for the results of this process is not yet available. However, it is probable that the electric discharges between the metal part of the rotating tool and the metal part of the normally stationary workpiece which is to be deformed into a tool first removes the metallic bonding surrounding the embedded nonconductive hard materials to the desired depth. Since the nonconductive, small, polycrystalline particles are not picked up by the electric charge or are only indirectly picked up by the discharging to the directly adjacent metal fields, these remain as small residues in the form of projections and are picked up mechanically and broken rapidly by the rotating tool. No discharge takes place in this short instant of mechanical contact with a very small particle. It is possible that a discharge of the surrounding metal fields occurs simultaneously with the mechanical pick-up of a nonconductive projection which is freed from the metal bonding, whereupon the mechanical removal is favored or expedited.

Thus a significant difference exists between this and the treatment technique known from U.S. Pat. No. 4,236,985, in which a surface grinding of a pure metal piece takes place. Except for this difference, the grinding disk, with an applied electric potential, is held in permanent mechanical contact with the surface to be treated. Discharges thus occur only in the border area of the continuous mechanical treatment. Moreover, the additional discharge is not very effective, since the electrically conductive grinding disk is in permanent short-circuit connection with the workpiece. It is notable that this is also true for the part in the known technology wherein the mechanical grinding disk is electroerosively post-treated simultaneously or alternately, since this post-treatment electrode is pressed constantly on the grinding disk with a spring.

According to known technology, either a solid electrode is used in the so-called countersinking process, or the known wire-spark erosion is used for the spark-erosive treatment, as for cutting certain metal profiles in an electric electrolyte liquid, but the process according to the present invention proves that a rotating or rapidly moving tool serving as second contactless electrode is passed along a surface to be treated, which carries polycrystalline synthetic diamonds in it.

Only when a signal is obtained from the spark current or from the sparking voltage which indicates that no further electro-erosive removal is possible in a certain time or at a certain site, a mechanical removal then commences, which however is performed by the same tool. Therefore, the tool is metal and is electrically conductive, and is also mechanically erosive. Synthetic materials such as polycrystalline diamonds are particularly suitable for this purpose, in which the nonconductive portion is mechanically erosive and the conductive portion is electrically erosive. The rapid movement of the tool over the workpiece enables both treatment processes to remain accessible rapidly and without transition for all points of the workpiece which are being treated. The finest profiles can be produced. Any contour can be manufactured or treated.

A tub which is closed on all sides can be used to carry out this procedure, so as to prevent the liquid which is being thrown off the rotary tool, which is required at the point of treatment, from getting out of the device. According to one configuration of the invention, the space holding the treatment liquid, surrounding the treatment point, can be flooded completely so that the rotary tool is completely immersed.

The rotary treatment tool can be a metal-bonded grinding disk, which can also have diamonds therein. These diamonds could also be polycrystalline synthetic diamonds, so that there is a grinding process in addition to the spark erosive treatment between the rotary tool and the tool surface to be treated. To this effect, the rotary tool is guided along the direction of expansion of the surface being treated. While the spark-erosive treatment deals with the electrically conductive parts of the bond, the projecting, nonconductive parts can be treated simultaneously in a customary grinding process. This leads to especially good results, which make further post-treatment unnecessary.

At this point it is to be stressed that the process according to the invention concerns a true electro-erosive treatment. It does not have anything to do with electrolytic grinding. The customary electrolyte for the spark erosion can be substituted by any other liquid capable of the required heat transmission. Even water can be used. A rust prevention agent should be added to the water.

The present invention also differs from the known electro-erosive countersinking wherein metal workpieces are treated by rotation of the countersinking electrode in the workpiece. A purely electrical removal takes place with this electro-erosive countersinking, and there is no contact between the electrode and the workpiece, and if there should be such contact, it would not lead to any improvement of the treatment. On the other hand, the present process has to do with a combination of the contactless spark erosion and, at points where it is necessary, a true grinding.

Moreover, the rotary tool is not moved in the workpiece, but is moved along with expansion of the cavity in the workpiece. There is also a difference from the wire-spark erosion technique in this respect.

It is preferable, as mentioned, to also use a grinding disk in the present invention. This disk includes the nonconductive hard particles in a metal foundation and is rotated. During rotation, however, the grinding disk remains as an electrode at a certain distance over the workpiece. The distance can advantageously be automatically controlled dependent upon the electric parameters of the spark discharge. For simple treatments, for example for the manufacture of cutting surfaces on saws, drills or milling cutters, the workpiece can be moved back and forth under the rotating tool. However, other movements both of the tool and/or of the workpiece are also possible, in order to be able to treat complex or intricate profiles. These profile paths can be automatically controlled by a program memory.

Therefore, the known control technique can be used to deliver at least two types of treatment, in order to complete not only electronically stored shaping movements, but also, dependent upon the electric parameters, in order to undertake the spark gap readjustment, in order to optimize the material removal. Also, however, the angular velocity of the tool can be adjusted or readjusted dependent upon the electric parameters of the spark gap, also in order to optimize the material removal, both for an improved surface quality and also for expedient finishing.

If a change should be found in the spark gap during scanning of the electric parameters, and it is identified electrically or by an electronic plotting circuit as comprising a nonconductive area, then the electric contactless removal is transformed automatically into a very short mechanical contact removal, in order also to incorporate the nonconductive areas into the desired shape.

Normally the workpiece is stationary during treatment, except for a control movement during treatment breaks. According to one configuration of the invention, however, during manufacture of rotary symmetrical tools from a workpiece, it is possible to allow this workpiece to rotate. Then the treatment tool can be rotated clockwise or counterclockwise. The relative angular velocity can also be varied throughout a treatment process. Thus, for an intensive electro-erosive treatment of a metal area, the relative peripheral velocity can be low at the point of treatment, to favor electric removal, and the relative velocity can be high, to favor the mechanical removal.

During testing, it was shown that the transition between the two types of treatment is carried out in the shortest time possible and completely automatically, so that this transition cannot be observed on the machine without special measures. Of course the sounds of the treatment vary, but since the noise changes continually as a result of the continual readjustment, the transition from contactless treatment state into contact treatment state and vice versa is not detectable. Only a rapid and brief change in the spark color can be detected as sign of the different type of treatment. On the contrary, tests of the surface quality have shown that all of the nonconductive inclusion roughnesses are smoothed.

The spark generator may be set at different frequencies, waves or pulse shapes. The voltage and current may likewise be set in accordance with the requirements of the material. Furthermore, in the manner known from metal treatment, the spark gap may be bridged over with an adjustable capacity.

In practice it has been shown that following manufacture of the surface having the desired quality the treatment may take place with the adjustment of various electrical parameters and said surface may be sealed in such a manner that a thin nonconductive film is made on the entire surface by simple mechanical treatment of said device with said tool. This film is made with treatment with or of synthetic diamonds of pure carbon.

Other features and advantages of the invention arise from the following description of one exemplary embodiment shown in the drawing with modifications.

In said drawings:

FIG. 1 is a perspective overview of a machine built according to the invention;

FIG. 2 is a detail of the cooperation of tool and workpiece;

Figure 3:
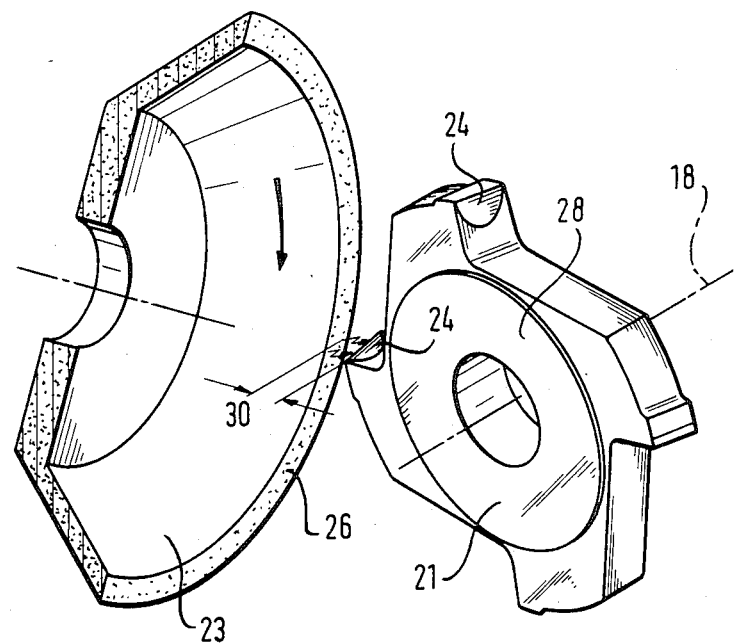
FIG. 3 is a detail differing from FIG. 2 with a different tool and another workpiece.

In a machine stand 10 are found tool carriages 12 and 14 arranged to slide relative to each other in a customary X-arrangement. In the present example, carriage 14 carries tool holder 16, which may move thereon in Y direction, and into which is clamped a workpiece 20 which pivots around an axis 18. A tool 22 can be moved in X direction opposite this workpiece 20, from which in the example a finger miller may be made. In this example, the tool is a grinding disk with beveled grinding rim 24, which is driven by a not shown motor in the direction of the arrow shown in the FIG. 2 detail drawing.

A different use is shown in FIG. 3. On the index axis is found a four-cutter miller 21 with a metal body 28, which carries cutters 24 made of small fillets with polycrystalline synthetic diamonds. These are treated electro-erosively in the normal manner, with the aid of the grinding disk, a cupped disk 23 with grinding surface 26, over a gap 30. In this instance, jar disk 23 rotates in the direction of the arrow which is shown. Tool holder 16 can simultaneously be moved back and forth in Y direction. There is automatic feed in X direction on the basis of index values set on the control board 40. The automatic control is to be further explained hereinafter relative to FIG. 9.

A current of pressurized medium coming from an adjustable nozzle 42 directed at the treatment spot cools the treatment spot and carries away the removed materials. Nozzle 42 is connected with a medium source 46 through line 44 and beneath the treatment station the medium is collected in a container 48. The medium can be a light electrolyte or an air mixture with finely divided demineralized water droplets, which are not detrimental to the electric discharge.

However it can also be advantageous to use a protective gas, for example argon, as medium.

Figure 4:
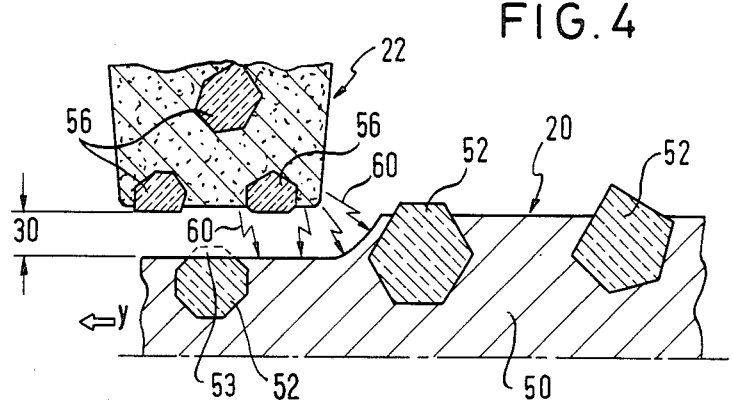
FIGS. 4 to 8 are diagrammatic cross sections of five sequential stages of a treatment process.
Figure 5:
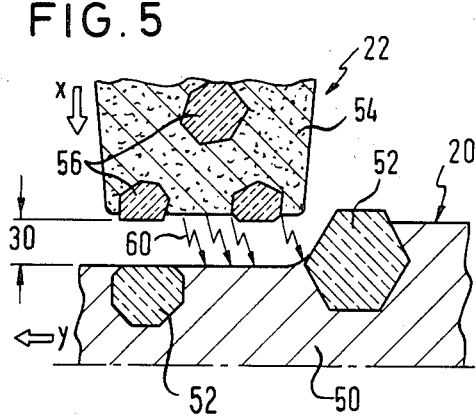
Figure 6:
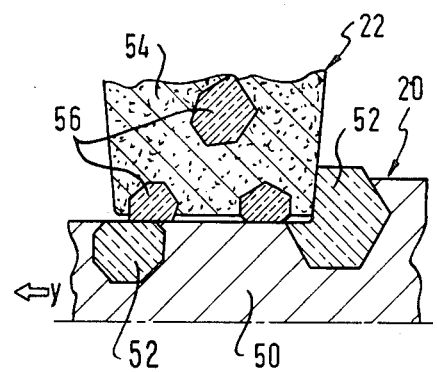
Figure 7:
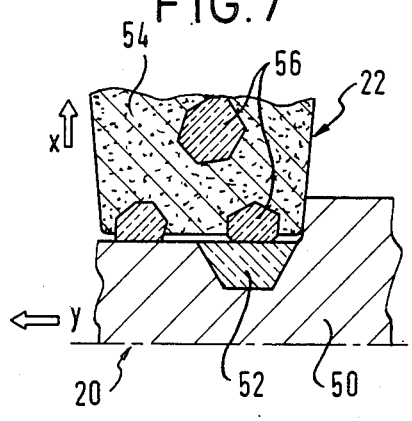
Figure 8:
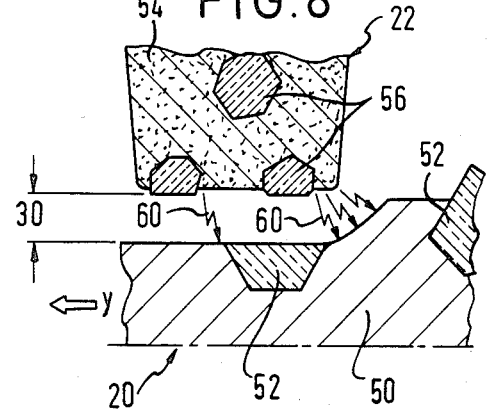

The material is removed generally as shown in the cross section drawings FIGS. 4 to 8 along line B—B of FIG. 2 according to the not yet totally explained disclosure:

Both tool 22 and workpiece 20 which is moving in Y direction consist of nonconductive hard material particles in a metal foundation. On workpiece 20, nonconductive inclusions 52 are present in the metal foundation 50. Nonconductive hard material inclusions 56 are also found in grinding tool 22 in an electrically conductive environment 54. FIG. 4 shows how the sparks 60 from metal part 54 spark over the gap 30 to the metal area 50 and remove it. A feed movement in X direction does not occur at this moment. A previously mechanically removed part 53 of nonconductive inclusion 52 is still shown with broken lines, but is no longer found in gap 30. If the spark formation slows down in the course of the Y movement, because another nonconductive area 52 is covered, then the electric parameters are changed and a follow-up of the feed in X direction occurs automatically (FIG. 5). This continues until mechanical contact with the next nonconductive area 52, which is removed mechanically as shown in FIG. 6. Since a progressive contact thus occurs between nonconductor and nonconductor, until it may also become a direct contact of conductive parts 54 with conductive parts 50, an electric signal can be obtained, which controls the resetting movement in X direction (FIG. 7) and transfers to the purely electro-erosive treatment through a predetermined gap 30 (FIG. 8). The change between electric and entirely short-circuited mechanical treatment methods occurs very rapidly and cannot be readily detected by the between 500 and 600 rpm velocity of the tool.

Figure 9:
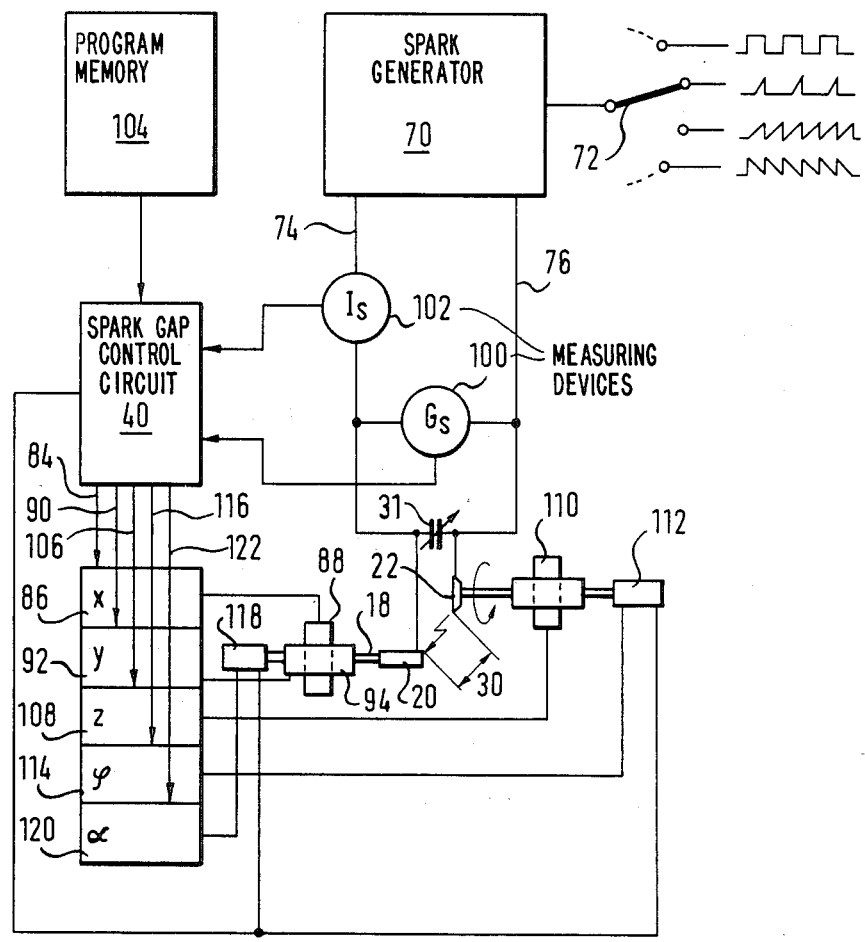
FIG. 9 is a diagrammatic block diagram.

The electric control is shown schematically in FIG. 9. A spark generator 70 is adjustable with a selector lever 72 to different pulse shapes according to the material being treated. The frequency is adjustable between 10 and 100 kHz. The voltage is between 100 and 300 volts and corresponds to the relative speed differential between tool 22 and workpiece 20. The electric energy from spark generator 70 is supplied through lines 74 and 86 to workpiece 20 or to tool 22, which are kept insulated from each other, so that a spark can be sparked over gap 30. Parallel to spark gap 30 is a stepped adjustable capacity 31 for adjustments, as is known from metal treatment.

The required placements and index value settings can be undertaken by control circuit 40. This can be done manually through a keyboard 80, whereby the values which are used can be read on indicator panels 82 (FIG. 1).

A movement in the X axis can thus be solicited and controlled through a line 84 with the aid of a signal convertor 86 and a setting device 88. This movement in the X axis serves in the present example for the adjustment and control of gap 30. The changes of the gap voltage Us can be picked up for readjustment by a measuring device 100 and alternately or simultaneously a gap current change Is is picked up by a measuring device 102, and control circuit 40 can be set to do the evaluation.

The tool can be adjusted dependent upon current 102. The one current value proportional to spark gap 30 value can be fed to a comparator, in which it is compared with an adjustable index value. So long as the current is still high and thus the signal for intensive treatment moves in the Y direction, there is no further adjustment in Y direction. Only if sufficiently low current flows in the comparator, there occurs another adjustment in X direction and therewith a deeper penetration into the workpiece surface. With preselection of the different wave values, the degree of treatment can be preset from coarse to finest treatment.

Through a control line 90 and a signal convertor 92, a servomotor 94 controls the movement along the U axis. This servomotor 94 can move back and forth during the cutting treatment. The extent of the back and forth movement can be picked up by a program memory 104 or by the regenerated electric values 100, 102 of the spark gap through the control circuit 40. However a simple reversal by final switching is also possible.

A Z signal is laid on a control circuit 108 with the line 106, from which a servomotor 100 for height adjustment of tool 22 is influenced.

Figure 10:
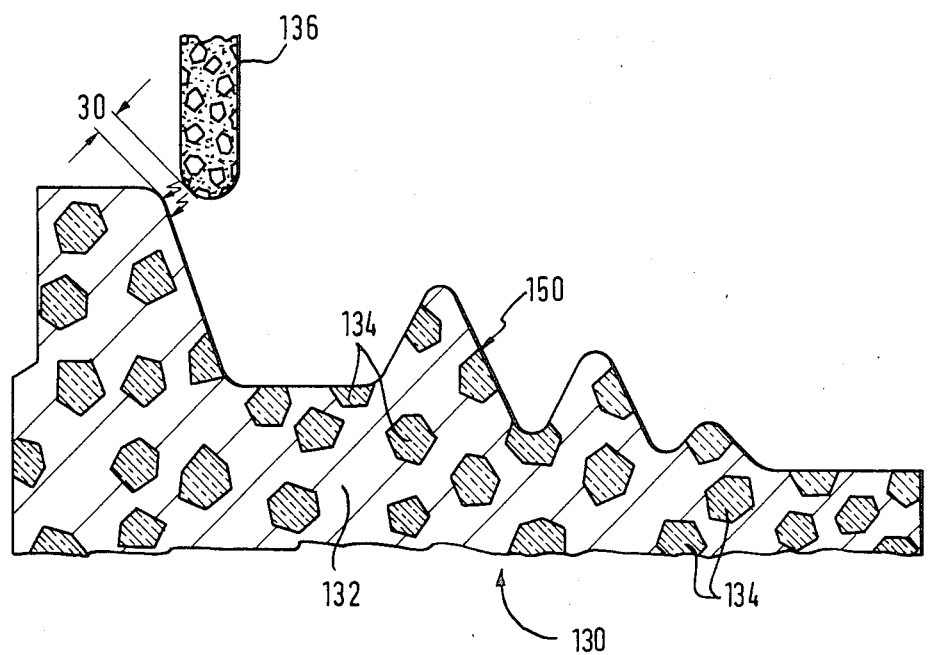
FIG. 10 is an exemplary profile of a rotary symmetrical tool produced from a workpiece.

Finally, the velocity of a drive motor 112 for tool 22 can be regulated through a φ signal, which is produced in the circuit 114, dependent upon a signal laid through a line 116. So long as workpiece 20 following each treatment stage is to be brought into another position by a control movement, motor 118 is designed as index motor and controlled by a control circuit 120 corresponding to an α signal on a line 122. As above, however, motor 118 can also be designed as permanent rotary drive, if workpiece 20 is to be treated as rotary body and is to rotate around its axis during its treatment. Rotation symmetrical tools particularly could be provided with a profile from a program stored in program memory 104 for example as in FIG. 10. In this representation, a workpiece 130 is shown diagrammatically with nonconductive hard inclusions 134 in a metal foundation 132, in which a profile 150 is to be obtained with the aid of a tool 136. For this purpose, an analog or digital program which can be read from memory 104 is used for profile 150, as soon as the workpiece 130 is clamped and aligned on axis 118. Motor 118 then drives the workpiece and motor 112 drives the tool 136, which normally is guided by the control signals with the gap 30 over profile 150.

Figure 9A:
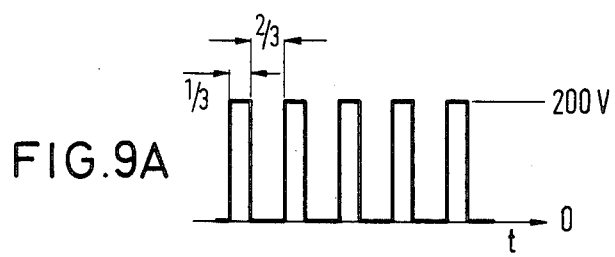
FIG. 9a is a preferred wave shape produced from the spark generator.

FIG. 9a shows a preferred pulse shape which is supplied from spark generator 70 to spark gap 30. It has been shown to be favorable to select a pulse sequence which is connected for one third of the period and is disconnected for two thirds of the period. A spark of this type provides optimum material removal.

Figure 11:
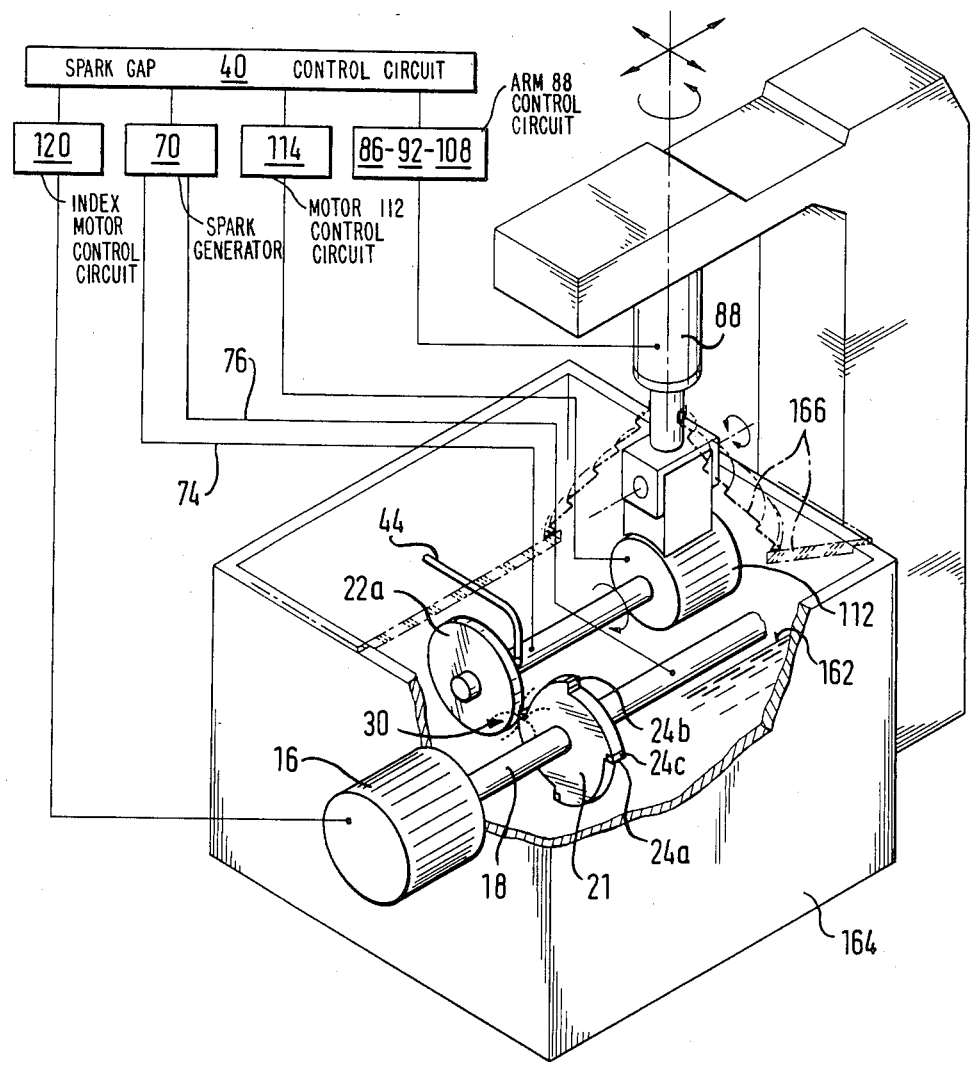
FIG. 11 is a different configuration of the machine with a tub as spray protection or for an immersion treatment.

FIG. 11 shows another embodiment with a tool 21, which corresponds approximately to that of FIG. 3. The segments 24a with polycrystalline synthetic diamonds could have front surfaces 24b to the front in operation position, facing tool 21 during rotation, dependent upon the intended use of tool 21, or could use the side surfaces 24c or both surfaces 24b and 24c at the same time.

The present invention relates either to the treatment of these front surfaces 24b or side surfaces 24c. The following description relates to the treatment of side surface 24c. However it is to be understood that even when parts of the device are in some other position relative to each other, front surface 24b can still be treated in the same manner. Tool 21 is mounted on a journal 18 in order to bring it into treatment position. Journal 18 is connected with a manually or automatically adjustable control 16, which precisely positions the tool as desired before each treatment.

The control device 16 is shown here diagrammatically as an automatic control device, in which it is connected by an electric cable with the control circuit 120 described above.

In the position shown, there is spark-erosive treatment of the side surface 24c to the left in the drawing. A stationary electrode is not used in the customary sense, but rather a rotary electrode 22a is used for the spark-erosive treatment, which advantageously can itself be a tool having polycrystalline diamonds therein. In the embodiment shown, it is a metal-bonded grinding disk 22a with synthetic diamonds. This grinding disk 22a rests on a shaft which is rotated by the electric motor 112. The control circuit 114 controls this rotation and therewith regulates the velocity of grinding disk 22a, preferably by direct voltage control of electric motor 112. The direct voltage is therefore selected to allow little use of voltage, and in order to guarantee good control. Also, low voltage can be used, which limits the insulation problems, because motor 112 and grinding disk 22a should be able to operate at least partially or even completely immersed.

The mechanical unit of grinding disk 22a and motor 112 is suspended on an adjustable movable arm 38. The movement can be as shown by the arrows. The movement of certain treatments or feed and discharge movements are regulated by the control circuits 86, 92 and 108, to which control arm 88 is connected.

In the case shown, during spark erosion treatment of side surface 24c on tool 21 by rotating grinding disk 22a, an axial movement takes place relative to motor 112 in addition to the rotation of grinding disk 22a.

A spark generator 70 is provided for spark production between grinding disk 22a and side surface 24c, and its electric feed line 74 is mounted on the insulated shaft opposite the special parts.

In this manner the current is electronically controlled to grinding disk 22a and makes grinding disk 22a supply spark-erosive treatment to the one electrode. The other electric feed 76 from spark generator 70 leads to the electrically insulated unit of shaft 18 facing the other parts and to the superimposed and therewith electrically connected tool 21, which in this manner is to be the second electrode for the spark erosion. The spark-over gap 30 and the rotary grinding movement, which includes the nonconductive parts of the diamond foundation, provide rapid and very precise treatment.

The spark frequency, the velocity and the spacing of rotary electrode 22a from surface 24c and the size and direction of movement of the shaft in axial direction can be automatically controlled to the optimum or desired programmable value For this, control circuits 120, 114, 42, 36, 86, 92 and 108, and spark generator 70, are connected with each other through control device 40. Thus the spark frequency in spark gap 30 can be coupled with generator 70 with the control circuit 114 of motor 112, so that the velocity of motor 112, the spark frequency, and the voltage are optimally coordinated with each other. The spark frequency is such and is dependent upon the periphery of the rotary tool 22a, and the velocity of motor 112 must be so set that the spark does not separate and does not reignite. The changing spark voltage or current may be used as measure for readjustment of the speed.

The spark erosive treatment takes place in a liquid 162. The treatment station with tool 21 to be treated and treatment tool 22a is found in a vat 164 filled with liquid 162. The adjustable direct feed line 44 serves for special delivery of liquid directly to the treatment spot and for removal of the heat.

If the treatment is carried out in not completely flooded state, liquid particles are whirled off from rotary tool 22a and vat 164 may be closed with a cover 166. Tool 21, rotating treatment tool 22a and its motor 112 are found in vat 164. Control device 16 may be found outside vat 164. Electric insulation is to be provided for the passages through the wall of vat 164 and cover 166. Cover 166 can have a bellows-like packing, which seals the projecting parts of control arm 88, but its capacity to move cannot be effected. Liquid 162 can be a traditional electrolyte, a lubricant liquid or a coolant, as desired. It is even possible to work in simple water. It would be advantageous to add a rust-resistant agent to the water for protection of the device.

I claim:

1. A method for combined electro-erosive machining/mechanical grinding of a workpiece of metal-bonded electrically non-conductive hard materials in an electrically conductive metal matrix comprising the steps of:
   (a) providing a combined spark erosion-mechanical grinding tool consisting of electrically nonconductive abrasive material in an electrically conductive metal matrix;
   (b) rotating said tool in close non-contact relationship to said workpiece;
   (c) applying an electrical potential between said tool and said workpiece thus establishing a circuit effecting spark erosion between juxtaposed metal matrix portions of said tool and said workpiece;
   (d) moving said tool relative to said workpiece for forming a predetermined profile on said workpiece;
   (e) adjusting the non-contact distance between said tool and said workpiece in dependence upon the difference in an electrical signal derived from said circuit when metal matrix materials are in juxtaposition of said tool and workpiece for forming the predetermined profile of the metal matrix portion of said workpiece; and
   (f) moving said tool into grinding contact with said workpiece when said tool is juxtaposed said electrically nonconductive hard materials of said workpiece for forming the predetermined profile of the electrically nonconductive hard materials of the workpiece in response to an electrical signal derived from said circuit.

2. The method of claim 1 further comprising the step:
   (g) controlling the speed of said tool.

3. The method of claim 1 further comprising the step:
   (g) adjusting said tool in accordance with a stored program for profile machining.

4. The method of claim 1 further comprising the step:
   (g) supplying a fluid medium to a position of spark erosion and grinding between said workiece and said tool.

5. The method of claim 1 wherein step (c) comprises applying a square wave voltage having a 30 percent duty cycle between said tool and said workpiece.

6. The method of claim 1 further comprising the step:
   (g) linearly advancing said tool relative to said workpiece.

7. The method of claim 6 further comprising the step:
   (h) controlling the speed of advancing said tool relative to said workpiece in accordance with said machining speed of said tool.

8. A device for combined electro-erosive maching/mechanical grinding of a workpiece comprising a metal matrix electrically conductive hard material in an electrically conductive metal matrix comprising:
   (a) an electro-erosive maching/mechanical grinding tool comprising a conductive material having distributed electrically nonconductive abrading particles bonded therein;
   (b) drive means for imparting to said tool a working movement imparting at least a rotary movement to said tool;
   (c) a support means for supporting said workpiece;
   (d) displacement means for placing said tool in non-contact electro-erosive machining position relative to said workpiece;
   (e) a voltage source for applying a voltage between said tool and said workpiece in order to cause spark erosion between metal matrix materials and said conductive material in juxtaposition of said tool and said workpiece for forming a predetermined profile of said metal matrix of said workpiece;
   (f) means for controlling the distance between said tool and said workpiece in dependence upon the difference between electrical signals derived when electrically conductive portions of the tool and the workpiece are in juxtapositon; and
   (g) means for moving said tool in grinding contact with said workpiece when said tool is juxtaposed said electrically nonconductive hard materials of said workpiece for forming the predetermined profile of the electrically nonconductive hard material of the workpiece, said means for moving said tool into grinding contact being responsive to means for deriving electrical signals when said tool is juxtaposed said electrically non-conductive hard material.

9. The device of claim 8 further comprising control means for controlling the speed of said working movement of said tool.

10. The device of claim 8 wherein said voltage source is adjustable to different voltage wave forms.

11. The device of claim 10 wherein the duty cycle of said wave forms is adjustable.

12. The device of claim 11 wherein said voltage wave form is square wave form having a duty cycle of about one third.

13. The device of claim 8 wherein said means for controlling comprises a program memory for storing data to be used for profile machining of said workpiece by said tool.

14. The device of claim 8 wherein said displacement means comprise means for causing a relative movement between said tool and said workpiece.

15. The device of claim 14 wherein said relative movement is in the same direction as said working movement.

16. The device of claim 14 wherein said relative movement is in opposite direction to said working movement.

17. The device of claim 8 further comprising means for supplying a fluid medium to the spark erosion and grinding position between said tool and said workpiece.

18. The device of claim 17 wherein said fluid medium is a protective gas.

19. The device of claim 18 wherein said gas is argon.

20. The device of claim 8 wherein said tool is moved relative to said workpiece along a guide member.

21. The device of claim 8 further comprising lateral displacement means operating in dependence on said electrical signals.

22. The device of claim 8 further comprising:
   means for moving said rotating tool along a surface of said workpiece in direction of the longitudinal extension of said workpiece;
   A tub means closed at all sides and filled with fluid covering said surface of said workpiece.

23. The device of claim 22 wherein said rotating tool is a metal-bonded grinding disc.

24. The device of claim 23 wherein said grinding disc contains diamonds.

25. The device of claim 24 wherein said diamonds are polycrystalline synthetic diamonds.

26. The device of claim 25 further comprising a spark voltage generator, the changing electrical values of the spark voltage generators supply circuit being a measure for controlling the path guidance of said rotating tool in respect of said surface of said workpiece.

27. The device of claim 22 further comprising a control arm having suspended thereon a unit consisting of said rotating tool and said drive means;

and a control circuit for controlling the movement of said rotating tool towards and away from said surface by means of said control arm and for movement along a predetermined path parallel to the profile of said surface of said workpiece.

28. The device of claim 27 wherein said control arm projects into said tub means through a flexible port in a cover of said tub means.

29. The device of claim 27 further comprising a spark voltage generator connected to said control circuit of said drive means, the changing electrical values of the spark voltage supply circuit being a measure for adjusting the distance between said rotating tool and said surface of said workpiece.

30. The device of claim 27 further comprising a spark voltage generator connected to said control circuit, said changing electrical values in the spark voltage generator supply circuit being a measure for controlling the rotational speed of said drive means.

31. The device of claim 30 wherein the changing electrical values in the spark voltage generator supply circuit are a measure for adjusting the distance of the said rotating tool from said surface of said workpiece.

32. The device of claim 22 wherein said fluid is an electrolyte.

33. The device of claim 22 wherein said fluid is water.

34. The device of claim 32 or 33 wherein said fluid has added thereto a rust-preventing agent.

* * * * *